United States Patent
Tamura

(10) Patent No.: US 6,749,141 B2
(45) Date of Patent: Jun. 15, 2004

(54) LOADING MECHANISM IN WHICH A DRIVE RING COMPRISING A PRESS FORMED PRODUCT IS USED

(75) Inventor: Kazuya Tamura, Isehara (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/236,174

(22) Filed: Sep. 6, 2002

(65) Prior Publication Data

US 2003/0047634 A1 Mar. 13, 2003

(30) Foreign Application Priority Data

Sep. 10, 2001 (JP) ........................................ 2001/273623

(51) Int. Cl.$^7$ .............................................. G11B 23/04
(52) U.S. Cl. ..................................................... 242/340
(58) Field of Search ................................. 242/340, 341, 242/342; 360/95, 96.1, 96.2, 96.3, 85, 93

(56) References Cited

U.S. PATENT DOCUMENTS

| | | | |
|---|---|---|---|
| 4,805,045 A | * | 2/1989 | Schonfeld et al. ............ 360/93 |
| 5,414,585 A | | 5/1995 | Saliba |
| 5,793,574 A | | 8/1998 | Cranson et al. |
| 5,857,634 A | | 1/1999 | Hertrich |
| 5,862,014 A | | 1/1999 | Nute |
| 5,973,876 A | * | 10/1999 | Yeakley et al. ............... 360/92 |
| 6,241,171 B1 | | 6/2001 | Gaboury |
| 6,441,990 B2 | * | 8/2002 | Falace et al. ................. 360/85 |

FOREIGN PATENT DOCUMENTS

| | | |
|---|---|---|
| JP | 2000-100025 A | 4/2000 |
| JP | 2000-100116 A | 4/2000 |
| JP | 2000-149491 A | 5/2000 |
| WO | WO 86/07295 A1 | 12/1986 |
| WO | WO 86/07471 A1 | 12/1986 |

* cited by examiner

Primary Examiner—William A. Rivera
(74) Attorney, Agent, or Firm—Frishauf, Holtz, Goodman & Chick, P.C.

(57) ABSTRACT

In a loading mechanism which is for use in a tape drive having a supply reel motor and which serves to engage the supply reel motor with a supply reel contained in a tape cartridge inserted into the tape drive, a drive gear is arranged coaxially with a rotor of the supply reel motor to be movable in an axial direction, and is engaged with a drive hub, fixed to the rotor, and the supply reel in a rotating direction when the drive gear is moved towards one direction in the axial direction. A drive ring is arranged coaxially with the rotor to be movable in the axial direction and engaged with the drive gear against urging force of a spring. The drive ring is formed by pressing a ring-shaped plate material. An engaging pin is fixed to the drive ring and engaged through a guide slit of a cylindrical member with a cam groove of a ring cam.

8 Claims, 13 Drawing Sheets

LOADING MECHANISM IN WHICH A DRIVE RING COMPRISING A PRESS FORMED PRODUCT IS USED

BACKGROUND OF THE INVENTION

This invention relates to a magnetic recording/reproducing apparatus such as a linear tape storage system represented by DLT (Digital Linear Tape) or LTO (Linear Tape Open) and, in particular, to a loading mechanism for transmitting driving force of a supply reel motor to a reel hub of a tape cartridge.

A linear tape storage system of the type has been developed as a backup for a computer system. A variety of linear tape storage systems have heretofore been proposed. For example, a digital linear tape drive as the DLT is disclosed in U.S. Pat. No. 5,862,014.

The digital linear tape drive (hereinafter may simply be called the "drive" or the "tape drive") is adapted to receive a tape cartridge (hereinafter may simply be called the "cartridge") having a single reel (supply reel). The digital linear tape drive includes a take-up reel in the interior thereof. When the tape cartridge is received in the drive, a magnetic tape is pulled out from the tape cartridge to be wound up around the take-up reel through a head guide assembly (HGA). The head guide assembly serves to guide to a magnetic head the magnetic tape (hereinafter may simply be called "tape") pulled out from the tape cartridge. The magnetic head exchanges information to and from the tape. Typically, the head guide assembly comprises an aluminum plate having a boomerang-like shape and a plurality of large guide rollers, six in number, comprising bearings.

The head guide assembly is also called a tape guide assembly which is disclosed, for example, in U.S. Pat. No. 5,414,585. An example of the guide roller is disclosed in Japanese Unexamined Patent Publication No. 2000-100025 (JP 2000-100025 A).

As disclosed in U.S. Pat. No. 5,793,574 for example, a tape drive typically comprises a generally rectangular housing having a common base. The base has two spindle motors (reel motors). The first spindle motor (reel motor) has a permanently mounted spool (take-up reel) permanently mounted to the base and dimensioned to accept a magnetic tape streaming at a relatively high speed. The second spindle motor (reel motor) is adapted to receive a removable tape cartridge. The first spindle motor (reel motor) is called a take-up reel motor while the second spindle motor (reel motor) is called a supply reel motor. The removable tape cartridge is manually or automatically inserted into the drive via a slot formed on a housing of the drive. When the tape cartridge is inserted into the slot, the cartridge is engaged with the second spindle motor (reel motor). Prior to rotation of the first and the second spindle motors (reel motors), the tape cartridge is connected to the permanently mounted spool (take-up reel) by means of a mechanical buckling mechanism. A number of rollers (guide rollers) are positioned between the tape cartridge and the permanently mounted spool and guide the magnetic tape as it streams at a relatively high speed back and forth between the tape cartridge and the permanently mounted spool.

The digital linear tape drive of the above-mentioned structure requires a pulling device for pulling the tape from the supply reel to the take-up reel. Such pulling device is disclosed, for example, in International Publication No. WO86/07471. According to the disclosure in the publication, the take-up reel is provided with take-up leader means (first tape leader) coupled thereto. To the tape on the supply reel, supply leader means (second tape leader) is fixed. The first tape leader has a tab formed at its one end. The second tape leader has a locking hole. The tab is engaged with the locking hole.

Furthermore, a mechanism for joining the first tape leader to the second tape leader is required. Such joining mechanism is disclosed, for example, in International Publication No. WO86/07295.

Japanese Unexamined Patent Publication No.2000-100116 (JP 2000-100116 A) discloses "Structure of Leader Tape Engaging Part" capable of locking an end of a leader tape (second tape leader) to a tape end hooking part of the tape cartridge without requiring a tab protruding on a lateral side of the leader tape.

U.S. Pat. No. 5,857,634 discloses a lock system for preventing the rotation of the take-up reel of the tape drive when the tape cartridge is not inserted into the drive.

The tape drive further comprises a tape head actuator assembly. The tape head actuator assembly is positioned between the take-up reel or spool and the tape cartridge along a tape path defined by a plurality of rollers. During operation, the magnetic tape streams back and forth between the take-up reel or spool and the tape cartridge, coming into close proximity to the head actuator assembly while streaming along the defined tape path. An example of the head actuator assembly is disclosed in U.S. Pat. No. 5,793,574 mentioned above.

On the other hand, Japanese Unexamined Patent Publication No. 2000-149491 (JP 2000-149491 A) discloses an example of the tape cartridge to be received in the digital linear tape drive.

U.S. Pat. No. 6,241,171 discloses a "tape drive" in which a tape leader is urged from a tape cartridge to a take-up reel without using a buckling mechanism or a take-up leader.

As described above, the tape drive comprises the first and the second reel motors (i.e., the take-up reel motor and the supply reel motor). The first and the second reel motors are mounted on a chassis (more specifically, on a back surface of the chassis). As the first and the second reel motors, use is typically made of inner-rotor motors. After the tape cartridge containing the supply reel is inserted into the slot of the tape drive, the supply reel must be engaged with the supply reel motor in order to rotate the supply reel. Such engaging operation is called "loading" in this field of the art. A mechanism for engaging the supply reel with the supply reel motor is called a "loading mechanism". More in detail, a rotation driving surface (reel hub) of the supply reel is exposed out from a bottom surface of the tape cartridge, as disclosed in Japanese Unexamined Patent Publication No. 2000-149491 mentioned above. On the other hand, as will later be described in detail, the loading mechanism comprises a drive gear attached to a rotation shaft of a rotor of the supply reel motor to be movable up and down. When the tape cartridge is inserted into the slot of the tape drive, the loading mechanism is activated so that the drive gear is moved upward from the lower surface of the chassis. As a consequence, the drive gear is engaged with the reel hub of the cartridge so that the supply reel can be rotated by the supply reel motor.

Now referring to FIGS. 1 through 7, an existing loading mechanism will be described.

At first referring to FIGS. 2 through 4, description will be made of an existing magnetic recording/reproducing apparatus 10' comprising the existing loading mechanism.

The magnetic recording/reproducing apparatus 10' includes a chassis 20' having an upper surface (front surface) 20'U and a lower surface (back surface) 20'L. The chassis 20' comprises a diecast of a non-magnetic aluminum material. The upper surface 20'U is divided into first and second upper regions 20'U1 and 20'U2. Similarly, the lower surface 20'L is divided into first and second lower regions 20'L1 and 20'L2 faced to the first and the second upper regions 20'U1 and 20'U2, respectively. The chassis 20' is provided with first and second openings 20'a1 and 20'a2 formed in the first and the second upper regions 20'U1 and 20'U2 (the first and the second lower regions 20'L1 and 20'L2), respectively. The first opening 20'a1 has a cylindrical shape formed by bending a part of the first upper region 20'U1 downward. Similarly, the second opening 20'a2 has a cylindrical shape formed by bending a part of the second upper region 20'U2 downward.

The magnetic recording/reproducing apparatus 10' further comprises a take-up reel 30, a first reel motor 40', a slot portion 50, and a second reel motor 60. The first and the second reel motors 40' and 60 may be called a take-up reel motor and a supply reel motor, respectively.

The take-up reel 30 is rotatably mounted to the chassis 20' on the first upper region 20'U1. The first reel motor (take-up reel motor) 40' is fitted into the first opening 20'a to be attached to the chassis 20' in the first lower region 20'L2. The first reel motor 40' serves to rotate the take-up reel 30. The first reel motor 40' comprises a first motor substrate 41' made of a magnetic material, a first rotor 42' rotatably attached onto the first motor substrate 41', and a first stator 43' fixedly mounted on the first motor substrate 41'. The first reel motor 40' is of an inner-rotor type such that the first rotor 42' is disposed inside. The first rotor 42' has a first magnet 421'.

On the other hand, the slot portion 50 is formed on the second upper region 20'U2 of the chassis 20'. The slot portion 50 is adapted to receive a tape cartridge (not shown) comprising a rotatable supply reel (not shown). The second reel motor (supply reel motor) 60 is fitted into the second opening 20'a2 to be attached to the chassis 20' in the second lower region 20'L2. The second reel motor 60 serves to rotate the supply reel when the cartridge is inserted into the slot portion 50. The second reel motor 60 comprises a second motor substrate 61 made of a magnetic material, a second rotor 62 rotatably attached onto the second motor substrate 61, and a second stator 63 fixedly mounted on the second motor substrate 61. Like the first reel motor 40', the second reel motor 60 is of an inner-rotor type such that the second rotor 62 is disposed inside. The second rotor 62 has a second magnet 621.

As seen from FIGS. 2 and 4, the first reel motor (take-up reel motor) 40' is arranged in a reversed position with respect to the second reel motor (supply reel motor) 60. In other words, in the first reel motor 40', the first rotor 42' and the first stator 43' are arranged on the lower surface of the first motor substrate 41'. On the other hand, in the second reel motor 60, the second rotor 62 and the second stator 63 are arranged on the upper surface of the second motor substrate 61. Thus, in the second reel motor 60, the second magnet 621 of the second rotor 62 is exposed. Since the second magnet 621 has strong magnetism, the second reel motor 60 is covered with a plate 70 made of an iron-based magnetic material in order to shield magnetic leakage. The plate 70 may be called a floor receiver.

In the magnetic recording/reproducing apparatus 10' of the above-mentioned structure, a magnetic head 80 carries out information exchange upon a magnetic tape (not shown) pulled out from the supply reel and wound up around the take-up reel 30.

Next referring to FIGS. 1, 5, and 6, the existing loading mechanism 100' will be described. The loading mechanism 100' is arranged in the second opening 20'a2 between the supply reel motor 60 and the floor receiver 70. In other words, the loading mechanism 100' is arranged at the side of the lower surface 20'L (in the second lower region 20'L2) of the chassis 20'.

The supply reel motor 60 has a rotation shaft 611 fixed to the second motor substrate 61 and standing up from an approximate center thereof. The rotation shaft 611 rotatably supports the second rotor 62 through a ball bearing 612. Specifically, the second rotor 62 comprises a cylindrical rotary member 622 attached to the ball bearing 612, a dish-shaped rotary member 623 extending from a lower end of the cylindrical rotary member 622 in a direction perpendicular to an extending direction of the rotary shaft 611 and having an outer peripheral end perpendicularly bent upward, and the second magnet 621 having a ring shape and fixedly attached to an outer peripheral surface of the outer peripheral end of the dish-shaped rotary member 623.

On the other hand, the second stator 63 is disposed on the second motor substrate 61 in close proximity to an outer periphery of the second magnet 621. As illustrated in FIG. 2, the second stator 63 comprises a plurality of stator cores radially extending outward and a plurality of stator coils wound around the stator cores, respectively.

As seen from FIG. 3, the loading mechanism 100' has a drive hub 110 fixed to an upper end of the cylindrical rotary member 622 of the second rotor 62 by three screws 101. The drive hub 110 has a generally annular shape and has an outer peripheral end bent downward. Specifically, the drive hub 110 has a ring-shaped portion 111 extending in parallel to the second motor substrate 61 and fixed to the upper end of the cylindrical rotary member 622, and a cylindrical portion 112 perpendicularly bent downward from an outer peripheral end of the ring-shaped portion 111. The cylindrical portion 112 is provided with three grooves 112a (only one being illustrated in FIG. 1) formed on its outer peripheral wall to extend in a vertical direction (i.e., a direction along which the rotary shaft 611 extends) at an angular interval of 120°. The cylindrical portion 112 has three engaging holes 112 (two of them being illustrated in FIG. 1) formed at its lower end between every adjacent ones of the three grooves 112a at an angular interval of 120°.

Around the drive hub 110, a drive gear 120 is arranged. The drive gear 120 has a generally double-cylinder shape. Specifically, the drive gear 120 comprises an inner cylindrical portion 121, an outer cylindrical portion 122 spaced from the inner cylindrical portion 121 at a predetermined distance, and a ring-shaped portion 123 connecting the inner and the outer cylindrical portions 121 and 122 at their upper ends. Therefore, the drive gear 120 has a cylindrical groove 120a formed between the inner and the outer cylindrical portions 121 and 122. When the drive gear 120 is moved upward as illustrated in FIG. 6, the cylindrical portion 123 is engaged with a reel hub of the cartridge. In the cylindrical groove 120a, a spring 130 is disposed. The spring 130 continuously urges the drive gear 120 upward. The inner cylindrical portion 121 has an inner peripheral wall provided with three rod-like protrusions 121a (only one being illustrated in FIG. 1) inserted into the three grooves 112a of the drive hub 110 and extending in the vertical direction. The drive gear 120 further comprises an inner ring-shaped flange 124 formed at a lower end of the inner cylindrical portion 121 to protrude inward, and an outer ring-shaped flange 125 formed at a lower end of the outer cylindrical portion 122 to protrude outward. The inner ring-shaped flange 124 is provided with three engaging protrusions 124a (only one being illustrated in FIG. 1) formed at its upper end at positions corresponding to the three engaging holes 112b of the drive hub 110. Thus, when the drive gear 120 is moved upward as illustrated in FIG. 6, the three engaging protrusions 124a and the three engaging holes 112b of the drive hub 110 are engaged with each other.

When the loading mechanism 100' is not operated, the drive gear 120 is received in the second opening 20'a2 as illustrated in FIG. 5. When the loading mechanism 100' is operated, the drive gear 120 protrudes upward from the lower surface 20'L of the chassis 20' as illustrated in FIG. 6. Thus, the loading mechanism 100' has an elevation control mechanism (which will later be described in detail) for controlling an elevating movement of the drive bear 120. Briefly speaking, when the loading mechanism 100' is not operated, the elevation control mechanism carries out control so that the drive gear 120 is located at a lower level against the urging force of the spring 130 and received in the second opening 20'a2 as illustrated in FIG. 5. On the other hand, when the loading mechanism 100' is operated, the elevation control mechanism carries out control so that the drive gear 120 is located at a higher level utilizing the urging force of the spring 130 as illustrated in FIG. 6.

Next, description will be made in detail about the existing elevation control mechanism used in the existing loading mechanism 100'.

The existing elevation control mechanism comprises a ring cam 140' which is arranged to be rotatable around the rotary shaft 611 and which covers the second stator 63 of the supply reel motor 60, the second magnet 621 of the second rotor 62, and the outer peripheral end of the dish-shaped rotary member 623. More in detail, the ring cam 140' comprises a ring-shaped member 141' covering the second stator 63, the second magnet 621, and the outer peripheral end of the dish-shaped rotary member 623 and spaced at a predetermined distance from upper surfaces thereof, an inner cylindrical member 142' perpendicularly bent downward from an inner peripheral edge of the ring-shaped member 141' and spaced at a predetermined distance from an inner peripheral end of the second stator 63, and an outer cylindrical member 143' perpendicularly bent downward from an outer peripheral edge of the ring-shaped member 141' and spaced at a predetermined distance from an outer peripheral end of the second stator 63. The outer cylindrical member 143' is provided with a gear portion 140'a formed at a part thereof to be engaged with a gear (not shown). As illustrated in FIG. 1, the inner cylindrical member 142' is provided with three cam grooves 142'a (only one being illustrated in FIG. 1) formed on an inner peripheral wall thereof to obliquely extend from its lower end towards its upper end. The three cam grooves 142'a are arranged at an angular interval of 120° to be rotationally symmetrical with respect to the rotary shaft 611.

On the inner peripheral wall of the inner cylindrical member 142' of the ring cam 140', a cylindrical ring cam pivot 150' is disposed. The ring cam pivot 150' is provided with a flange 151' formed at its lower end to extend outward in a radial direction. The flange 151' is brought into contact with the lower end of the inner cylindrical member 142'. The ring cam pivot 150' is provided with three long holes or guide slits 150'a (two of them being illustrated in FIG. 1) formed at an equiangular interval of 120° to extend in the vertical direction in parallel to the rotary shaft 611.

A drive ring 160' is arranged to be movable vertically (up and down) in sliding contact with an inner peripheral wall of the ring cam pivot 150'. The drive ring 160' is provided with three through holes 160'a (two of them being illustrated in FIG. 1) formed at positions corresponding to the three guide slits 150'a and extending in the radial direction at an equiangular interval of 120°. From the outside in the radial direction, three rod-like engaging pins 161' are fitted into the three through holes 160'a through the three guide slits 150'a' of the ring cam pivot 150'. The three engaging pins 161' have radially outward ends engaged with the three cam grooves 142'a formed on the inner cylindrical member 142' of the ring cam 140', respectively.

When the drive gear 120 is received in the second opening 20'a2 as illustrated in FIG. 5, the three engaging pins 161' are located at lower ends of the three cam grooves 142'a. On the other hand, when the drive gear 120 is operated as illustrated in FIG. 6, the three engaging pins 161' are located at upper ends of the three cam grooves 142'a.

The drive ring 160' has an inner peripheral wall provided with a protruding portion 162' protruding inward from its upper part. The protruding portion 162' is engaged with the outer ring-shaped flange 125 of the drive gear 120. Thus, it will be understood that the position of the drive gear 120 is restricted by the position of the drive ring 160'.

As illustrated in FIG. 5 or 6, an upper surface of the ring-shaped member 141' of the ring cam 140' is covered with the floor receiver 70.

In the existing loading mechanism 100' described above, the drive ring 160' is formed in the following manner. A disc-shaped plate of aluminum is prepared and subjected to a cutting process to form an opening at the center of the plate. As a consequence, a ring-shaped member is obtained. Then, three through holes 160'a are formed in the ring-shaped member to obtain the drive ring 160'. Thus, production of the drive ring 160' inevitably requires a long time and is accompanied with generation of a large amount of cutting dust.

SUMMARY OF THE INVENTION

It is therefore an object of this invention to provide a loading mechanism capable of considerably reducing a production cost by the use of a drive ring comprising a press formed product.

According to this invention, there is provided a loading mechanism for use in a tape drive comprising a supply reel motor for driving a supply reel in a tape cartridge. The loading mechanism is for engaging a rotor of the supply reel motor with the supply reel. The loading mechanism comprises a drive hub fixed to the rotor, a drive gear arranged coaxially with the rotor to be movable in an axial direction, the drive gear being engaged with the drive hub and the supply reel in a rotating direction when the drive gear is moved towards one direction in the axial direction, a spring urging the drive gear towards the one direction in the axial direction, and a control mechanism for controlling the movement of the drive gear in the axial direction. The control mechanism comprises a ring cam arranged coaxially with the rotor to be rotatable and having a cam groove formed on its peripheral surface, a cylindrical member arranged coaxially with the rotor and having a guide slit extending in the axial direction, a drive ring arranged coaxially with the rotor to be movable in the axial direction and engaged with the drive gear against urging force of the spring, the drive ring being formed by pressing a ring-shaped plate material, and an engaging pin fixed to the drive ring and engaged through the guide slit with the cam groove.

DESCRIPTION OF THE PREFERRED EMBODIMENTS

Figure 1:
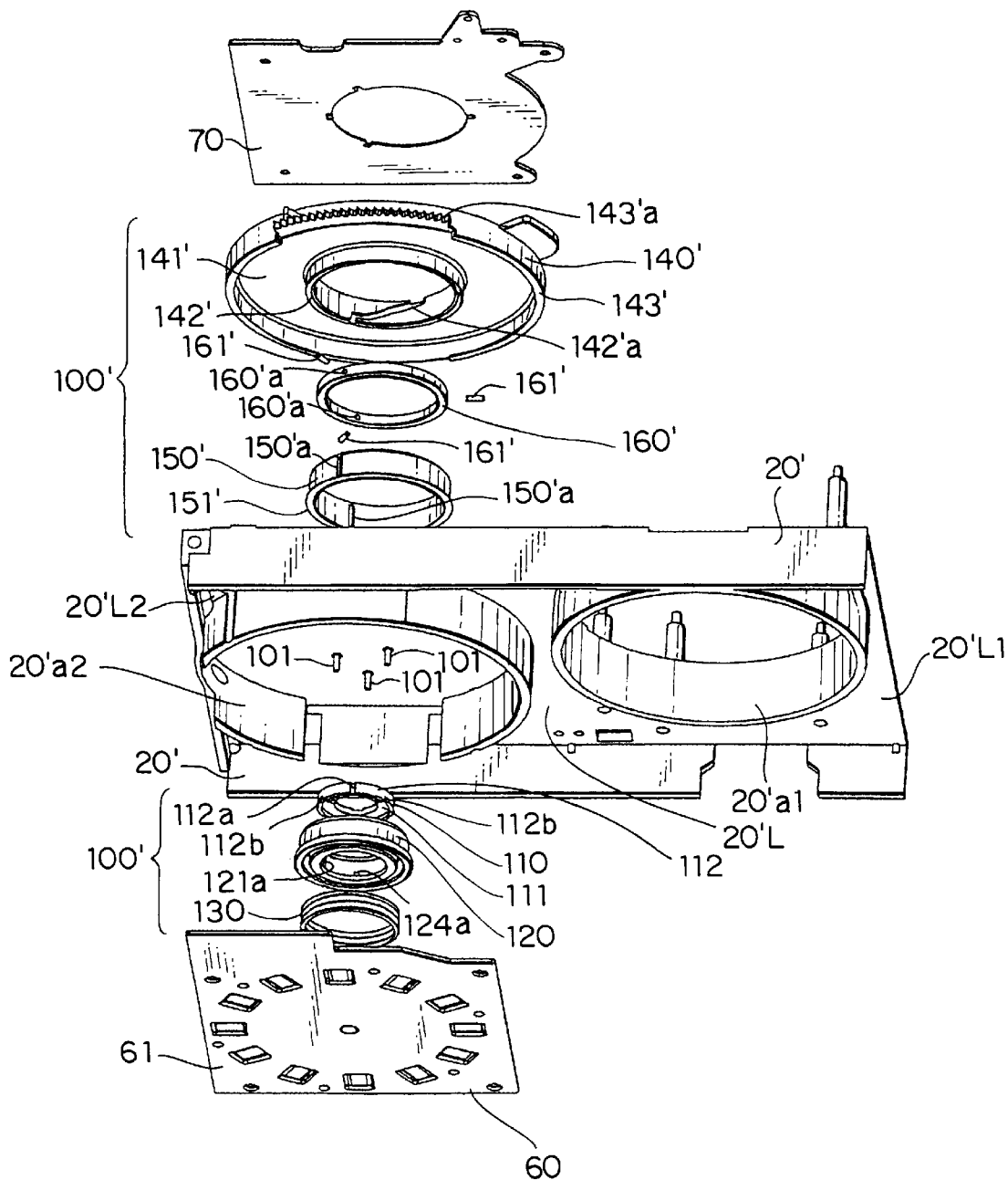
FIG. 1 is an exploded perspective view of an existing loading mechanism as seen from the side of a lower surface.
Figure 2:
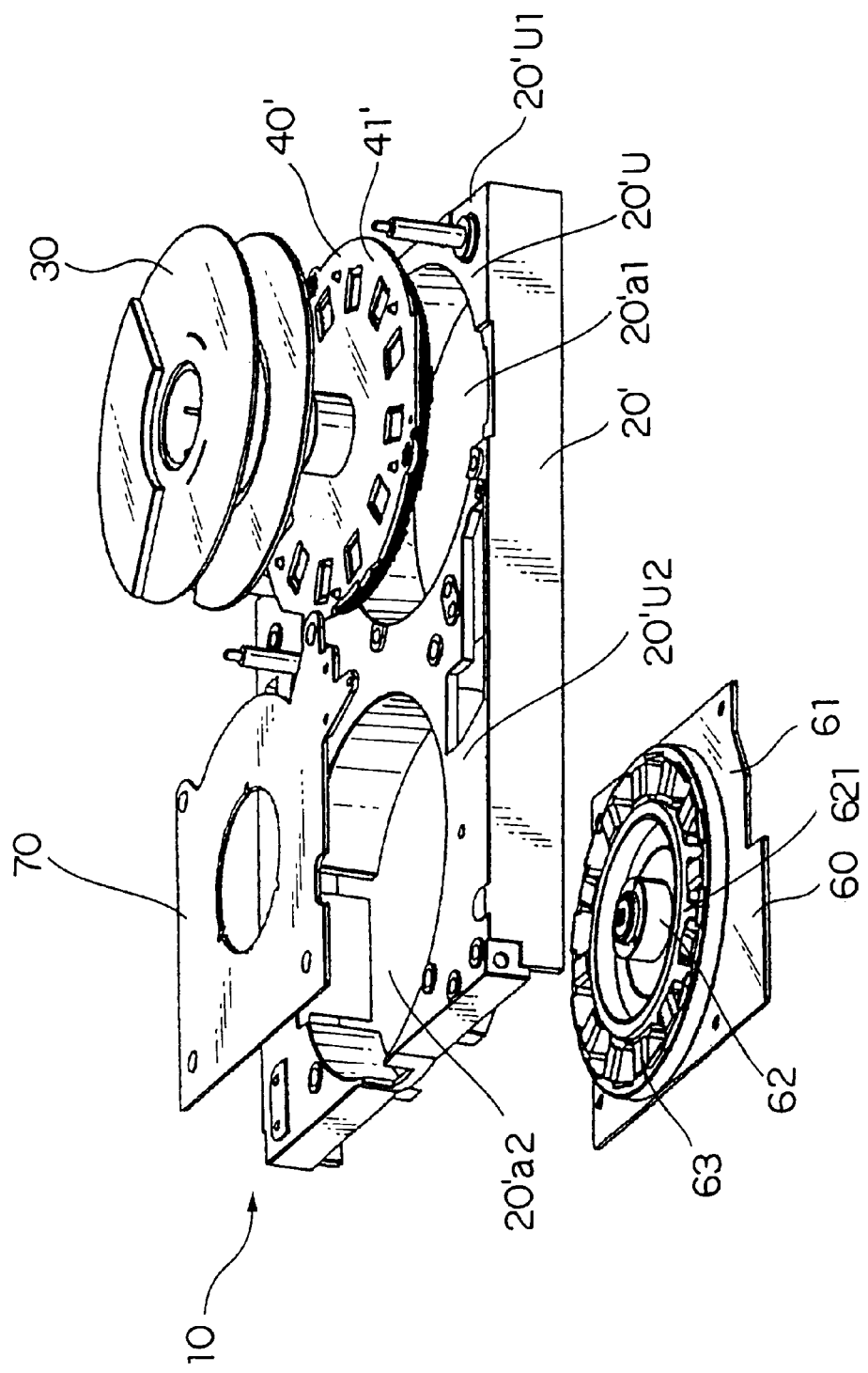
FIG. 2 is an exploded perspective view of a magnetic recording/reproducing apparatus including the loading mechanism illustrated in FIG. 1 as seen from the side of an upper surface.
Figure 3:
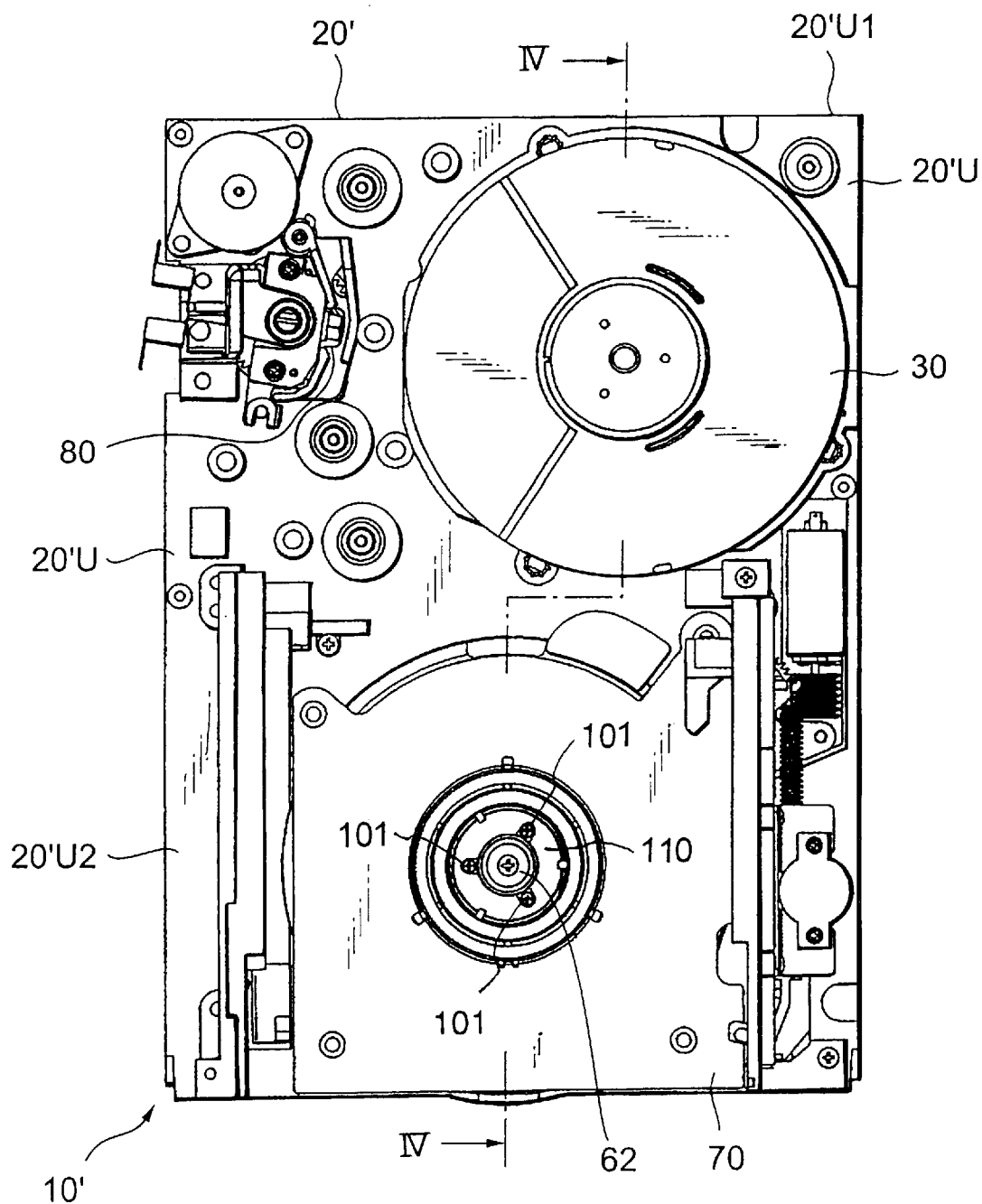
FIG. 3 is a plan view of the magnetic recording/reproducing apparatus illustrated in FIG. 2.
Figure 4:
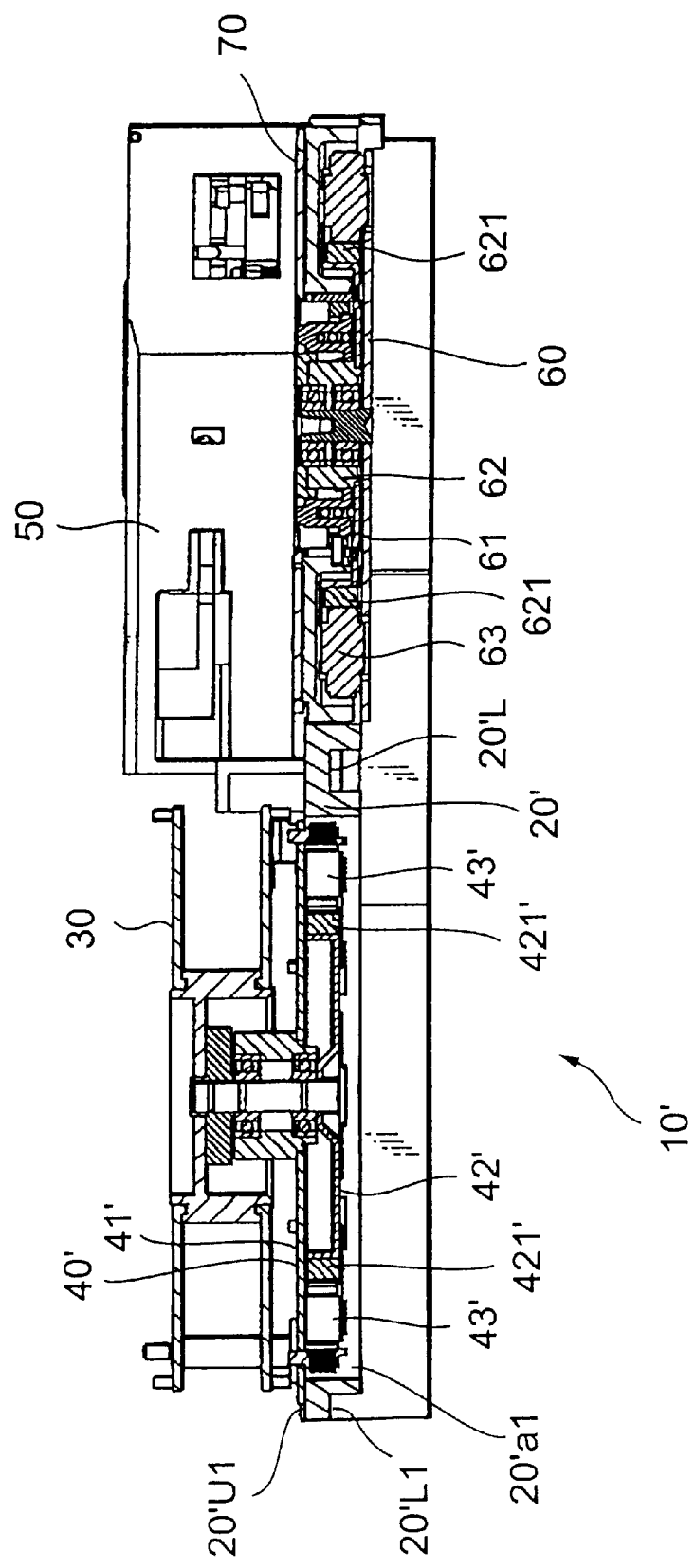
FIG. 4 is a sectional view taken along a line IV—IV in FIG. 3.
Figure 5:
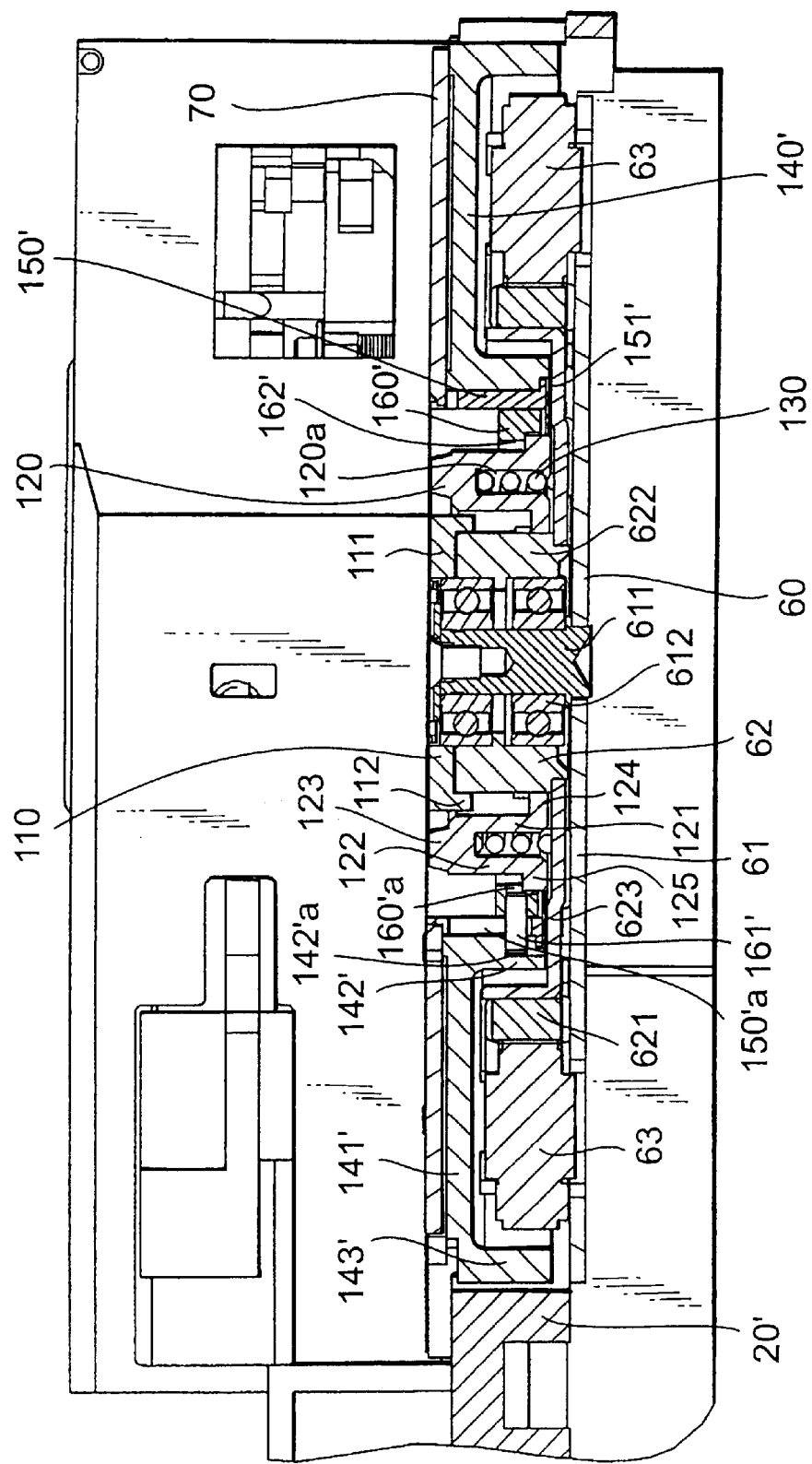
FIG. 5 is an enlarged sectional view of the loading mechanism illustrated in FIG. 4 when a drive gear is not operated.
Figure 6:
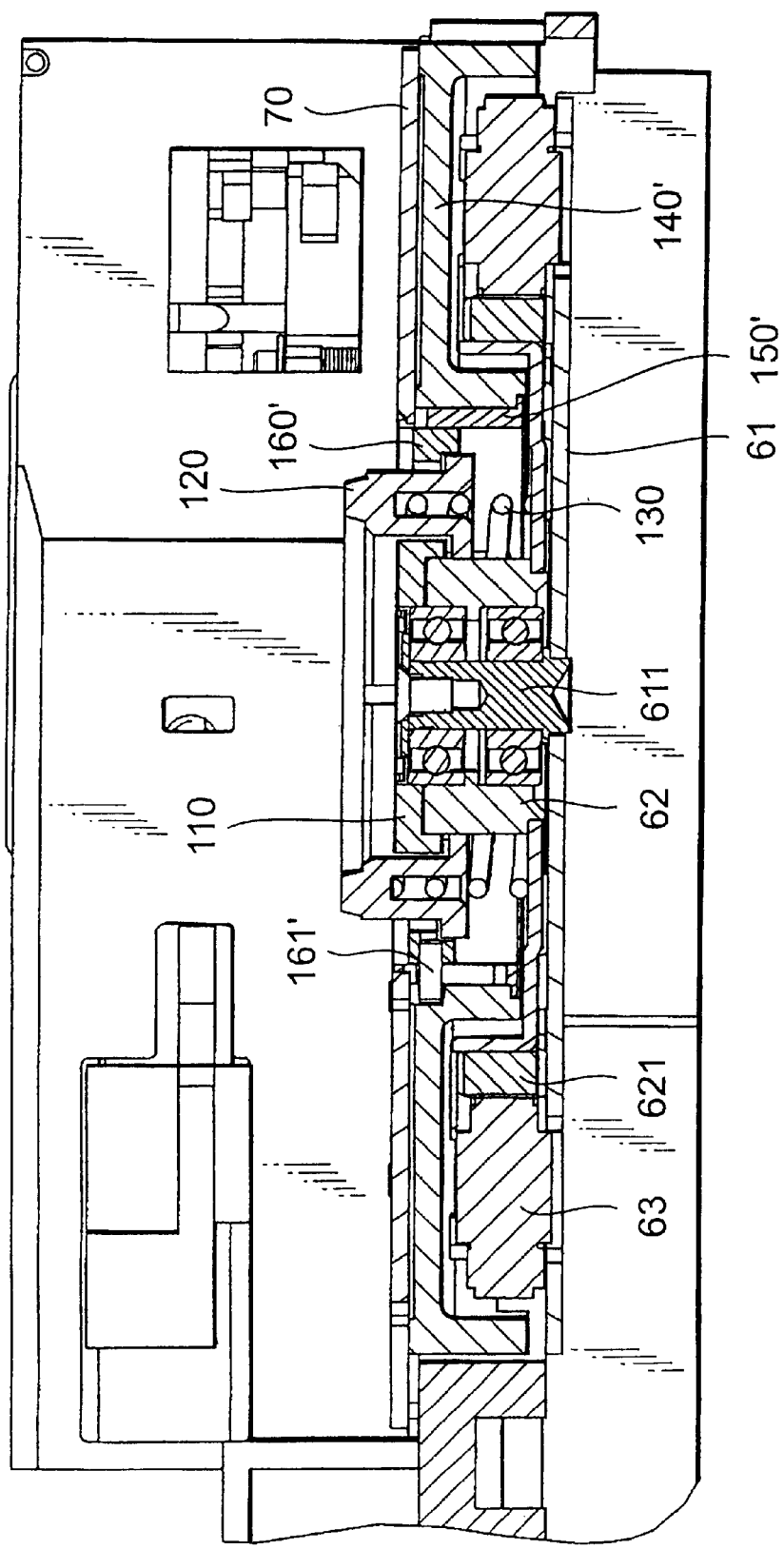
FIG. 6 is an enlarged sectional view of the loading mechanism illustrated in FIG. 4 when the drive gear is operated.

Now, an embodiment of this invention will be described in detail with reference to the drawing.

Referring to FIGS. 7 through 12, description will be made of a loading mechanism according to one embodiment of this invention.

At first referring to FIGS. 8 through 10, a magnetic recording/reproducing apparatus 10 including the loading mechanism 100 will be described.

The magnetic recording/reproducing apparatus 10 includes a chassis 20 having upper and lower surfaces 20U and 20L. The chassis 20 comprises a sheet metal chassis made of an iron-based magnetic material. The upper surface 20U is divided into first and second upper regions 20U1 and 20U2. Similarly, the lower surface 20L is divided into first and second lower regions 20L1 and 20L2 faced to the first and the second upper regions 20U1 and 20U2, respectively. The chassis 20 is provided with first and second openings 20a1 and 20a2 formed in the first and the second upper regions 20U1 and 20U2 (the first and the second lower regions 20L1 and 20L2), respectively. The first opening 20a1 has a disc-like shape. The second opening 20a2 has a cylindrical shape formed by bending a part of the chassis 20 (the second upper region 20U2) downward.

The magnetic recording/reproducing apparatus 10 further comprises a take-up reel 30, a first reel motor 40, a slot portion 50, and a second reel motor 60. The first and the second reel motors 40 and 60 are called a take-up reel motor and a supply reel motor, respectively.

The take-up reel 30 is rotatably mounted to the chassis 20 on the first upper region 20U1. The first reel motor (take-up reel motor) 40 is attached to the chassis 20 in the first lower region 20L2 in the manner such that a rotor part thereof (will later be described) protrudes from the first opening 20a1. The first reel motor 40 serves to rotate the take-up reel 30. The first reel motor 40 comprises a first motor substrate 40 made of a magnetic material, a first rotor 42 rotatably attached onto the first motor substrate 41, and a first stator 43 fixedly mounted on the first motor substrate 41. The first reel motor 40 is of an inner-rotor type such that the first rotor 42 is disposed inside. The first rotor 42 has a first magnet 421.

On the other hand, the slot portion 50 is formed on the second upper region 20U2 of the chassis 20. The slot portion 50 is adapted to receive a cartridge (not shown) comprising a rotatable supply reel (not shown). The second reel motor (supply reel motor) 60 is attached to the chassis 20 in the second lower region 20L2 in the manner such that a rotary shaft of its rotor (which will later be described) is inserted into the second opening 20a2. The second reel motor 60 serves to rotate the supply reel when the cartridge is inserted into the slot portion 50. The second reel motor 60 comprises a second motor substrate 61 made of a magnetic material, a second rotor 62 rotatably attached onto the second motor substrate 61, and a second stator 63 fixedly mounted on the second motor substrate 61. Like the first reel motor 40, the second reel motor 60 is of an inner-rotor type such that the second rotor 62 is disposed inside. The second rotor 62 has a second magnet 621.

Figure 8:
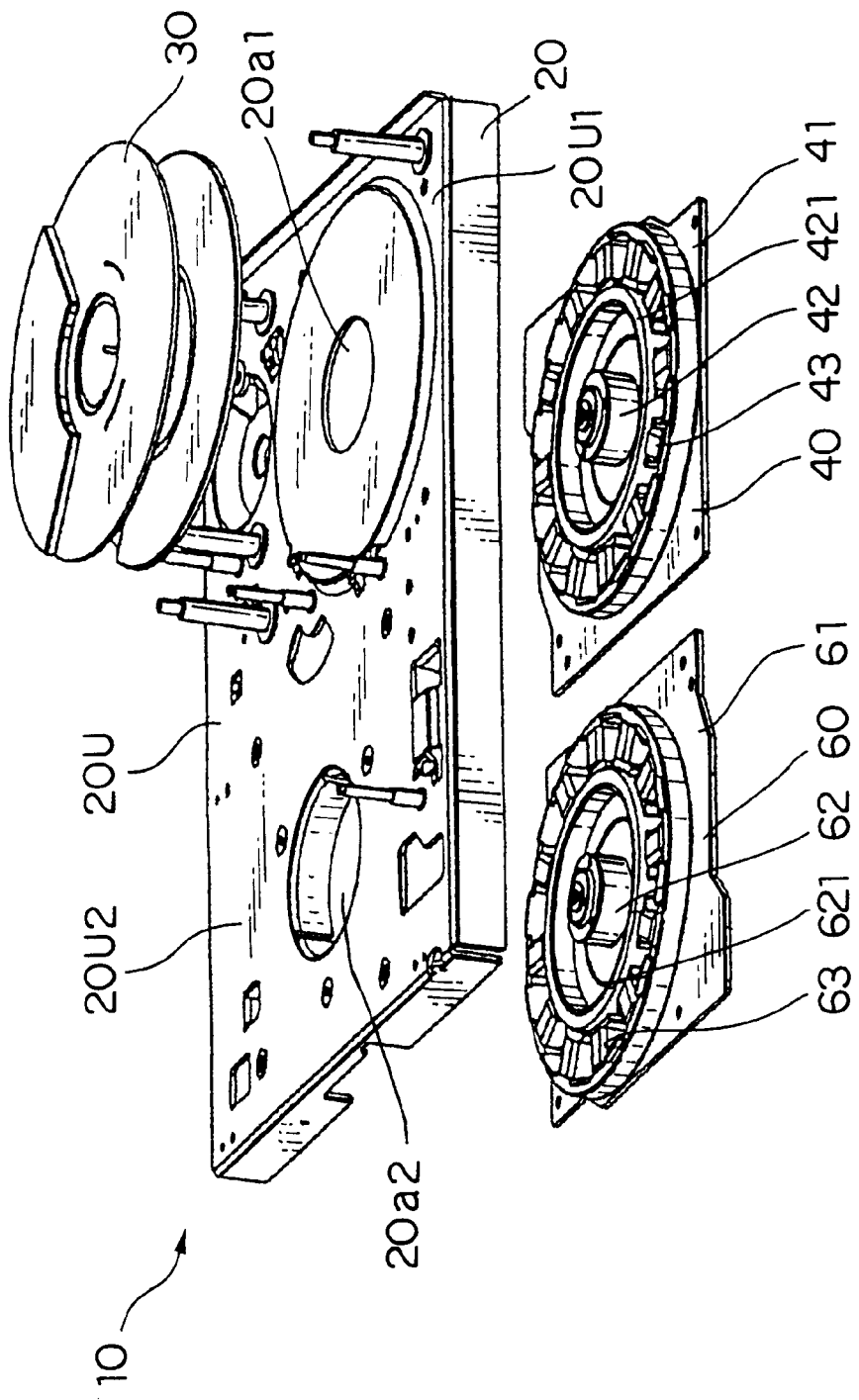
FIG. 8 is an exploded perspective view of a magnetic recording/reproducing apparatus including the loading mechanism illustrated in FIG. 7 as seen from the side of an upper surface.
Figure 9:
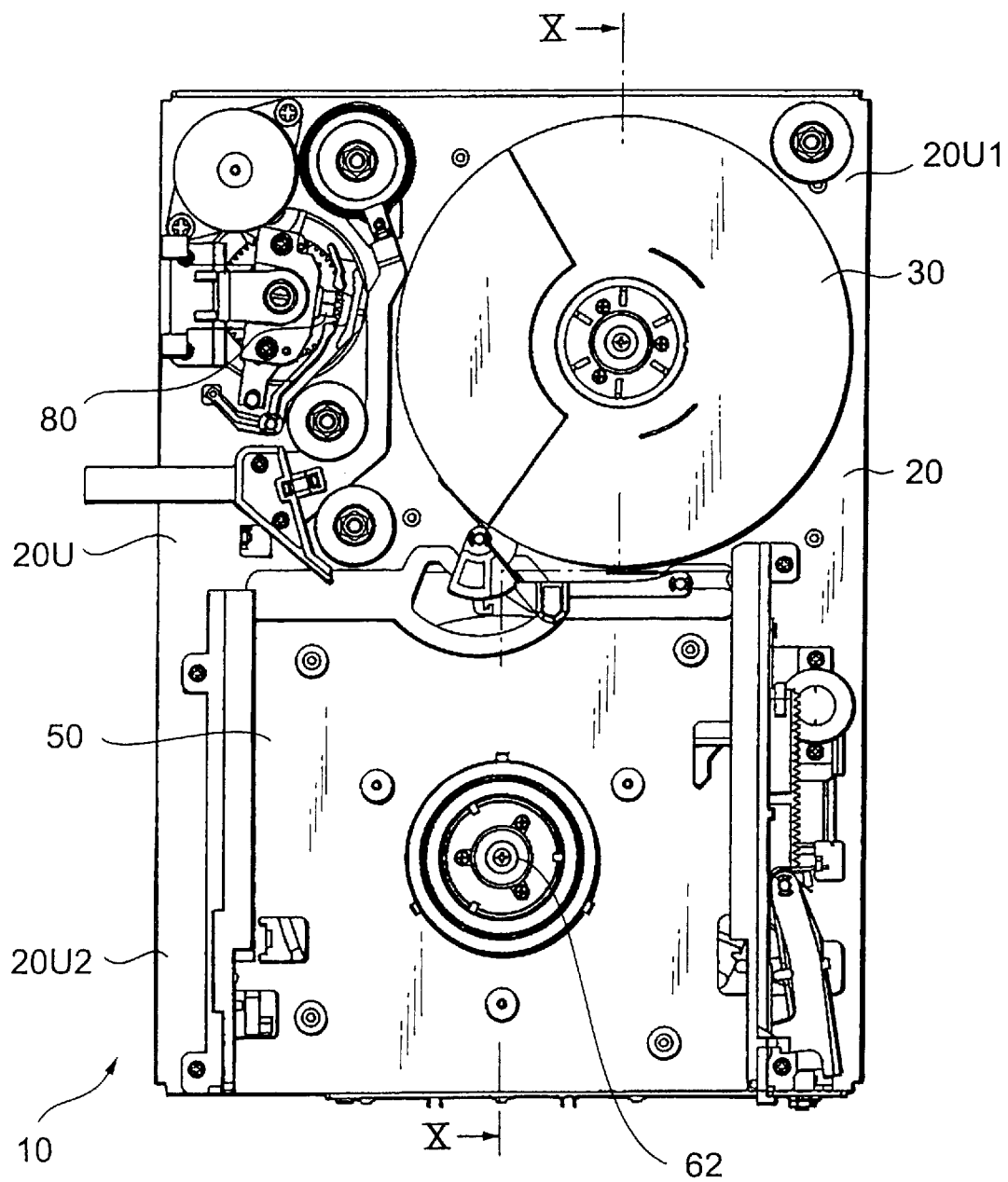
FIG. 9 is a plan view of the magnetic recording/reproducing apparatus illustrated in FIG. 8.
Figure 10:
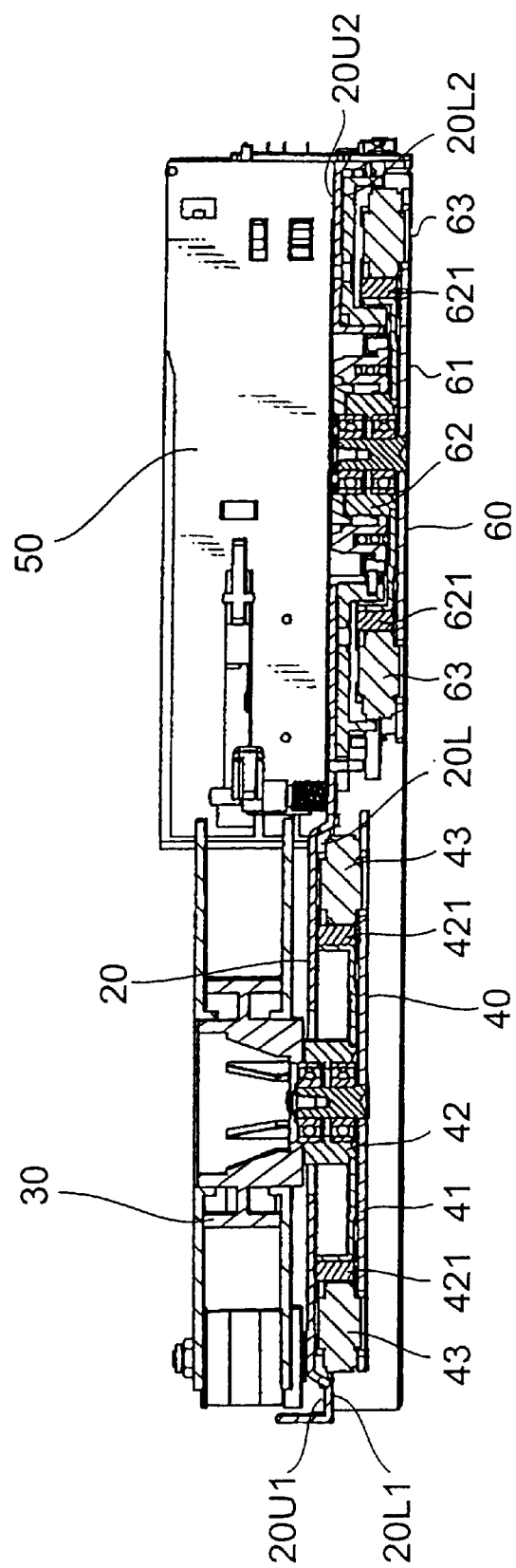
FIG. 10 is a sectional view taken along a line X—X in FIG. 9.

As seen from FIGS. 8 and 10, the first reel motor (take-up reel motor) 40 and the second reel motor (supply reel motor) 60 have a common or similar structure. Specifically, in the first reel motor 40, the first rotor 42 and the first stator 43 are arranged on the upper surface of the first motor substrate 41. Likewise, in the second reel motor 60 also, the second rotor 62 and the second stator 63 are arranged on the upper surface of the second motor substrate 61. Thus, in both of the first and the second reel motors 40 and 60, the first and the second magnets 421 and 621 of the first and the second rotors 42 and 62 are exposed.

As seen from FIGS. 8 and 10, both of the first and the second magnets 421 and 621 are covered with the chassis 20 made of the magnetic material so that magnetic leakage can be shielded.

In the magnetic recording/reproducing apparatus 10 of the above-mentioned structure, a magnetic head 80 carries out information exchange upon a magnetic tape (not shown) pulled out from the supply reel and wound up around the take-up reel 30.

Figure 7:
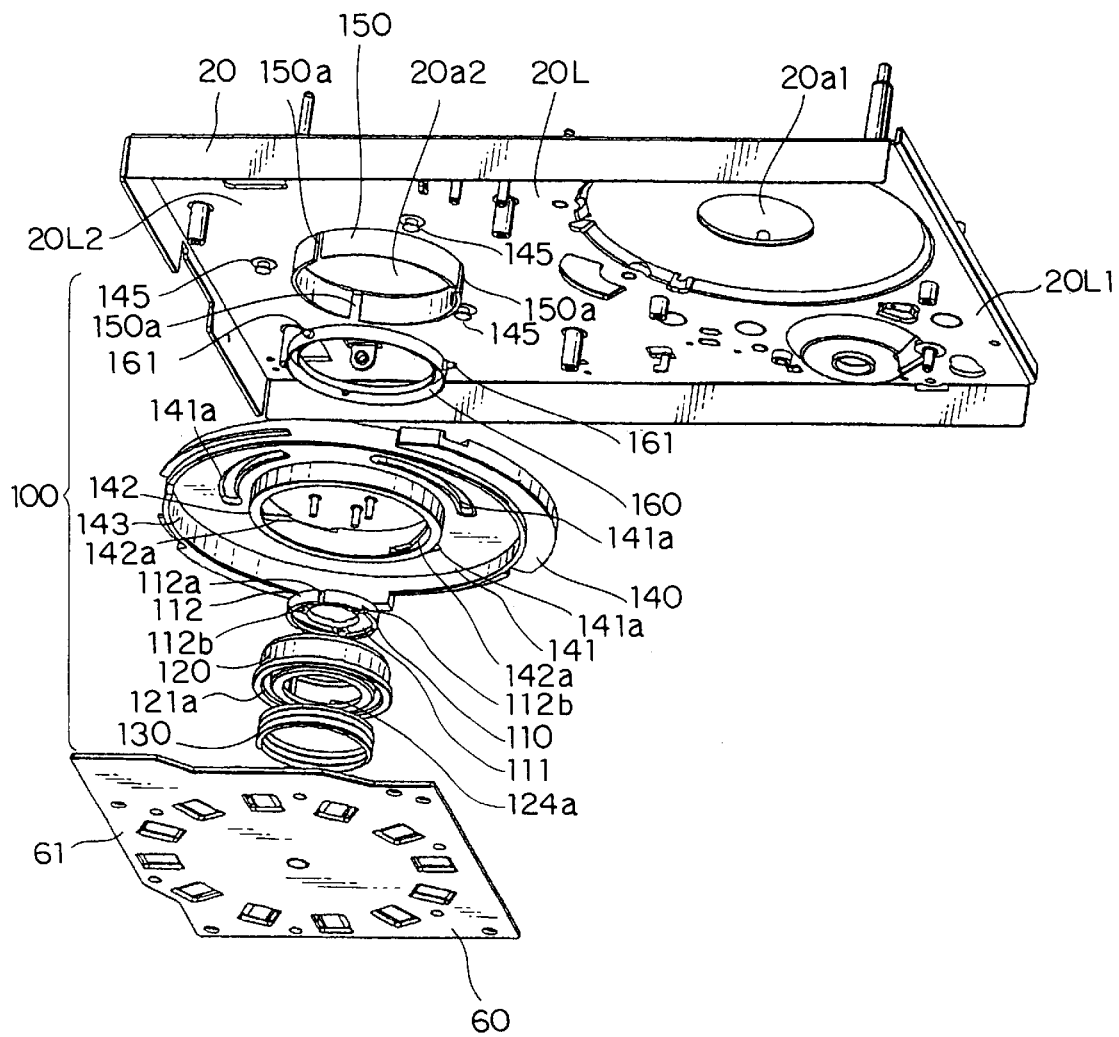
FIG. 7 is an exploded perspective view of a loading mechanism according to one embodiment of this invention as seen from the side of a lower surface.

Next referring to FIGS. 7, 11, and 12, the loading mechanism 100 will be described. The loading mechanism 100 is arranged between the supply reel motor 60 and the lower surface 20L (the second lower region 20L2) of the chassis 20. Herein, the supply reel motor 60 is similar in structure to that illustrated in FIGS. 11 and 12. Therefore, similar parts are designated by like reference numerals and description thereof will be omitted. As will later be described, the loading mechanism 100 is similar in structure to the existing loading mechanism 100' except an elevation control mechanism. Therefore, similar parts are designated by like reference numerals and description thereof will be omitted. Hereinafter, the elevation control mechanism alone will be described in detail.

The elevation control mechanism of the loading mechanism 100 comprises a ring cam 140 which is arranged to be rotatable around a rotary shaft 611 of the supply reel motor 60 and which covers the second stator 63 of the supply reel motor 60, the second magnet 621 of the second rotor 62, and the outer peripheral end of a dish-shaped rotary member 623 of the second rotor 62. More in detail, the ring cam 140 comprises a ring-shaped member 141 covering the second stator 63, the second magnet 621 of the second rotor 62, and an outer peripheral end of the dish-shaped rotary member 623 and spaced at a predetermined distance from upper surfaces thereof, an inner cylindrical member 142 perpendicularly bent downward from an inner peripheral edge of the ring-shaped member 141 and spaced at a predetermined distance from an outer peripheral end of the dish-shaped rotary member 623 of the second rotor 62, and an outer cylindrical member 143 perpendicularly bent downward from an outer peripheral edge of the ring-shaped member 141 and spaced at a predetermined distance from an outer peripheral end of the second stator 63. The outer cylindrical member 143 is provided with a gear portion (not shown) formed at a part thereof to be engaged with a gear (not shown). As illustrated in FIG. 7, the inner cylindrical member 142 is provided with three cam grooves 142a (two of them being illustrated in FIG. 7) formed on an inner peripheral wall thereof to obliquely extend from its lower end towards its upper end. The three cam grooves 142a are arranged at an angular interval of 120° to be rotationally symmetrical with respect to the rotary shaft 611.

The ring-shaped member 141 of the ring cam 140 is provided with three arc-shaped openings 141a formed around the rotary shaft 611 at an equiangular interval of 120° to be symmetrical. On the other hand, the chassis 20 is provided with three guide pins 145 formed in the second lower region 20L2 at positions corresponding to the three arc-shaped openings 141a and arranged at an equiangular interval of 120° to be symmetrical. The three guide pins 145 are inserted into the three arc-shaped openings 141a corresponding thereto.

As described above, in order to form the second opening 20a2 of a cylindrical shape, a part of the second upper region 20U2 of the chassis 20 is bent downward to form a cylindrical member 150. In other words, the cylindrical member 150 is formed by the use of a part of the chassis 20. The cylindrical member 150 has a function similar to that of the ring cam pivot 150' of the existing elevation control mechanism. In detail, the cylindrical member 150 is arranged in close proximity to the inner peripheral wall of the inner cylindrical member 142 of the ring cam 140. The cylindrical member 150 is provided with three long holes or guide slits 150a formed at an equiangular interval of 120° and extending in the vertical direction in parallel to the rotary shaft 611.

A drive ring 160 is arranged to be movable vertically (up and down) in sliding contact with an inner peripheral wall of the cylindrical member 150. The drive ring 160 is provided with three rod-like engaging pins 161 (two of them being illustrated in FIG. 7) attached thereto at positions corresponding to the three guide slits 150a and extending outward in the radial direction at an equiangular interval of 120°. The three engaging pins 161 have radially outward ends engaged with the three cam grooves 142a formed on the inner cylindrical member 142 of the ring cam 140.

Figure 11:
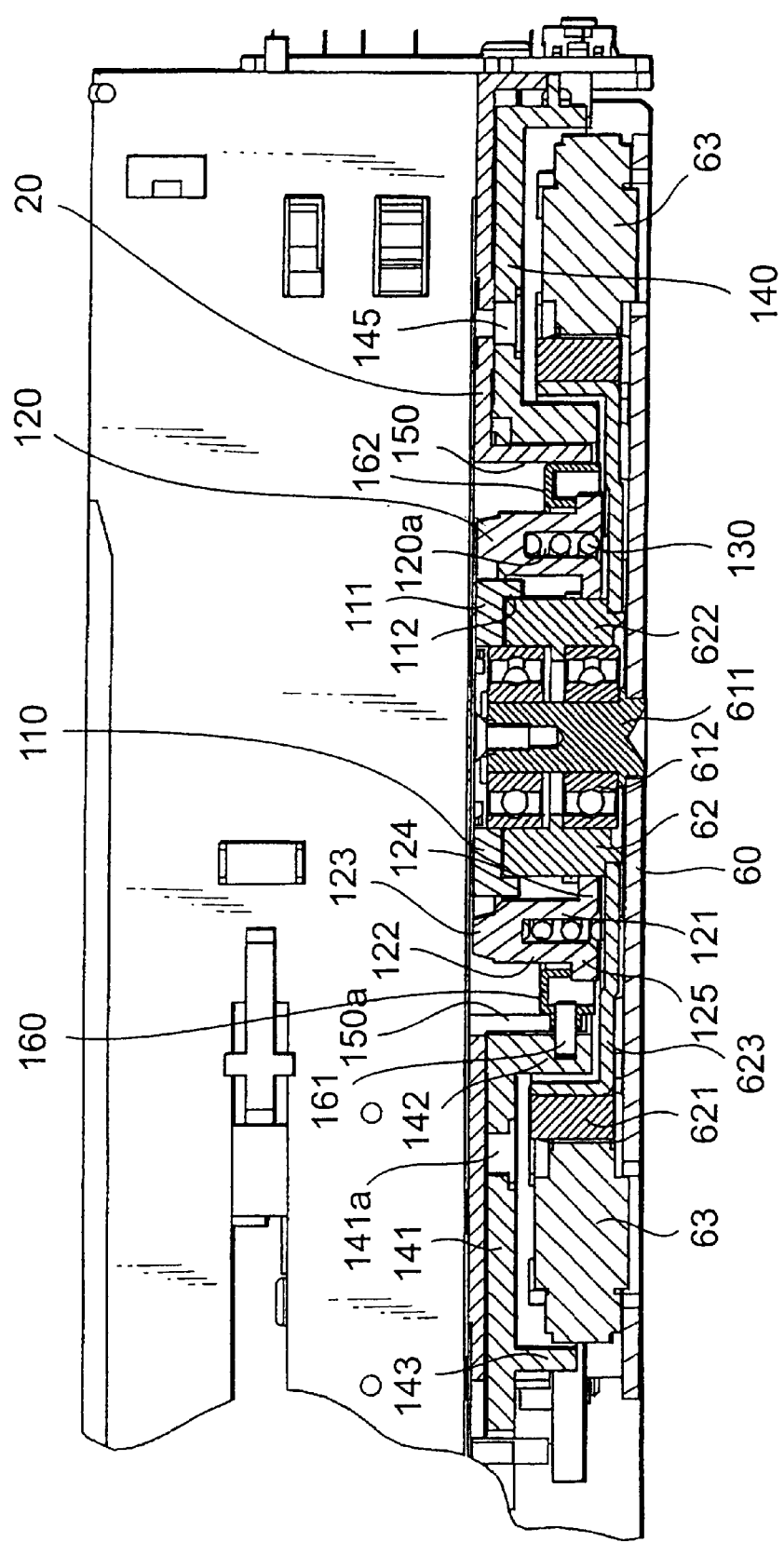
FIG. 11 is an enlarged sectional view of the loading mechanism illustrated in FIG. 10 when the drive gear is not operated.
Figure 12:
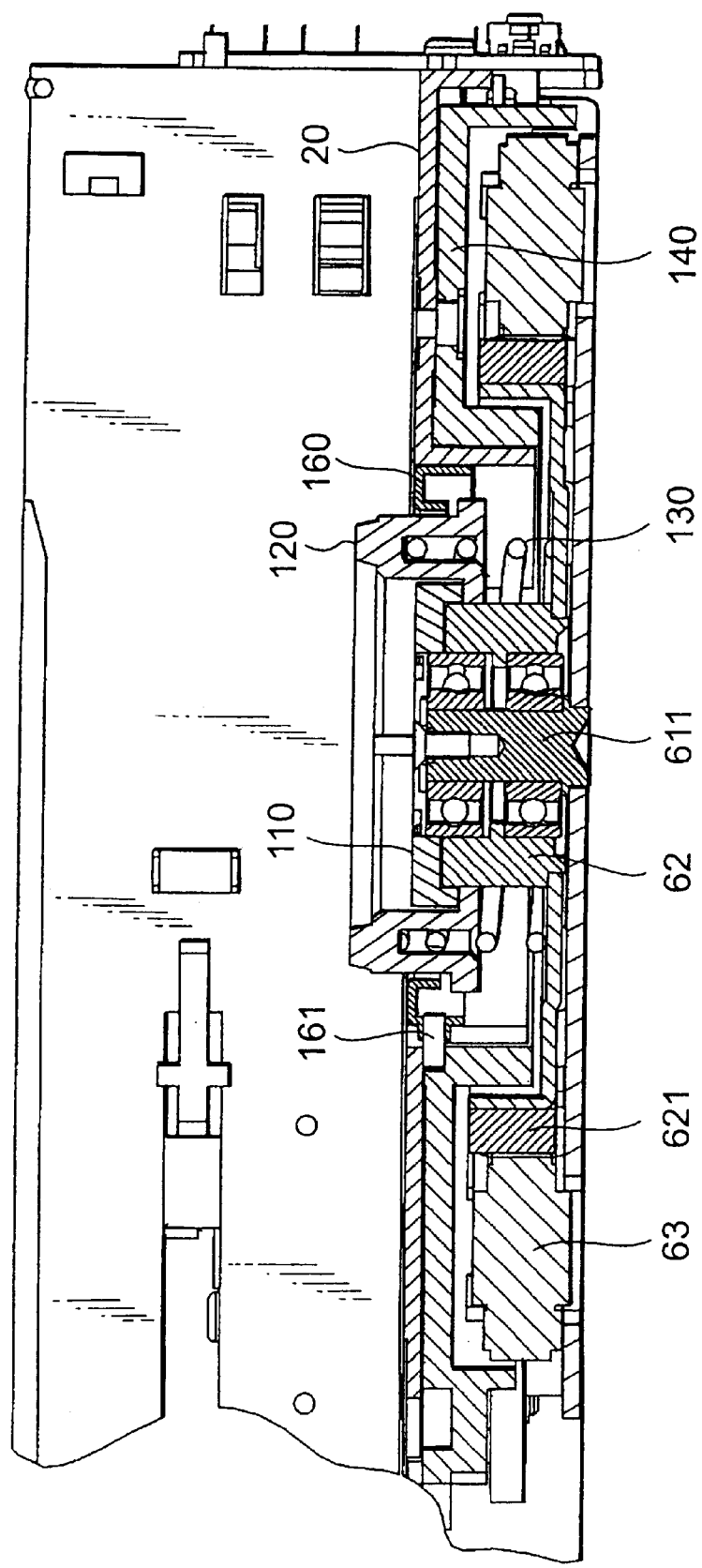
FIG. 12 is an enlarged sectional view of the loading mechanism illustrated in FIG. 10 when the drive gear is operated.

When the drive gear 120 is received in the second opening 20a2 as illustrated in FIG. 11, the three engaging pins 161 are located at lower ends of the three cam grooves 142a. On the other hand, when the drive gear 120 is operated as illustrated in FIG. 12, the three engaging pins 161 are located at upper ends of the three cam grooves 142a.

The drive ring 160 has a hook portion 162 having an L-shaped section and protruding inward from its upper end. The hook portion 162 is engaged with the outer ring-shaped flange 125 of the drive gear 120. Thus, it will be understood that the position of the drive gear 120 is controlled or restricted by the position of the drive ring 160.

As described above, in this embodiment, the ring cam pivot 150' in the existing mechanism is replaced by the cylindrical member 150 utilizing a part of the chassis 20. In other words, the guide slits 150a for the drive ring 160 for elevating the drive gear 120 are formed integral with the chassis 20. Therefore, it is possible to reduce the number of the components of the elevation control mechanism of the loading mechanism 100. Therefore, it is possible to reduce the cost of the components and to simplify the assembling process.

Next referring to FIGS. 13A to 13F, description will be made of the structure of the drive ring 160 together with a method of producing the same.

Figure 13C:
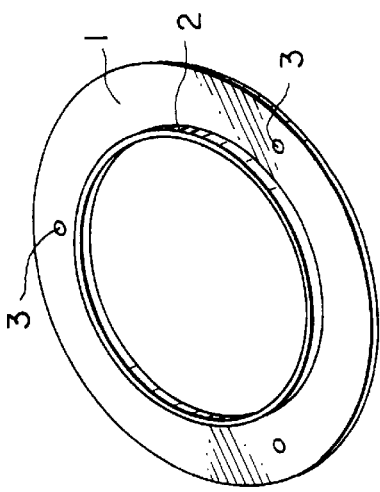
FIGS. 13A through 13F are views for describing the structure of a drive ring contained in the loading mechanism illustrated in FIG. 11 together with a method of producing the drive ring.
Figure 13B:
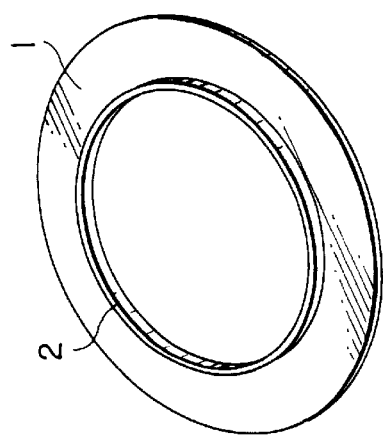
Figure 13A:
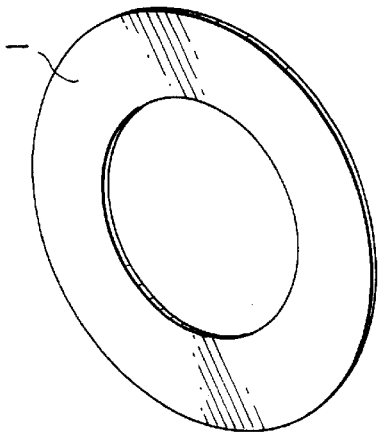

In order to produce the drive ring 160, a ring-shaped plate material 1 as illustrated in FIG. 13A is at first prepared. The ring-shaped plate material 1 is subjected to press drawing at its inner peripheral part to form an inner cylindrical portion 2 as illustrated in FIG. 13B.

Referring to FIG. 13C, a plurality of, for example, three through holes 3 are formed at equiangular intervals in an outer peripheral part of the ring-shaped plate material 1. Each of the through holes 3 is formed by so-called burring and therefore has a burring shape.

Figure 13F:
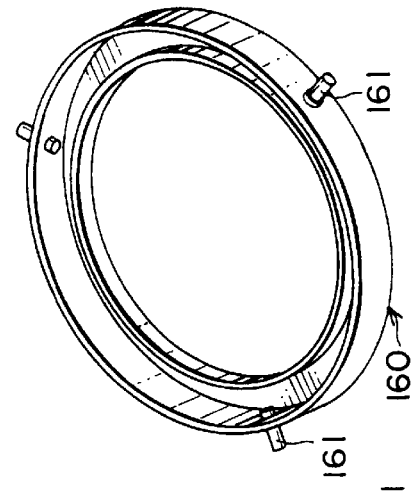
Figure 13E:
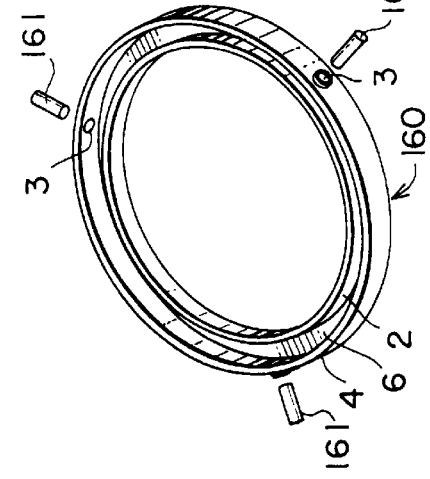
Figure 13D:
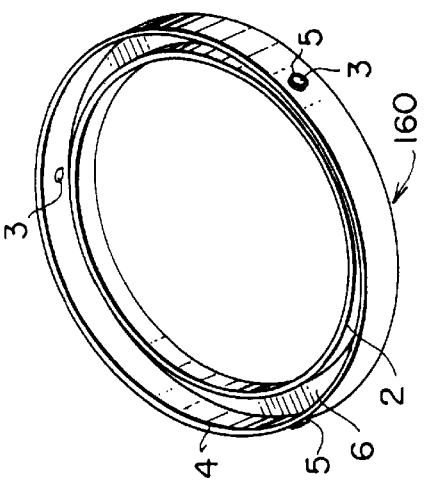

Next, the outer peripheral part of the ring-shaped plate material 1 is also subjected to press drawing to form an outer cylindrical portion 4 faced to the inner cylindrical portion 2 in a radial direction and spaced from the inner cylindrical portion 2 as illustrated in FIG. 13D. As a consequence, the through holes 3 are located in the outer cylindrical portion 4. The outer cylindrical portion 4 has an outer peripheral surface provided with a plurality of burring portions 5 corresponding to the through holes 3, respectively. Between the inner and the outer cylindrical portions 2 and 4, a ring plate portion 6 is left. A combination of the inner cylindrical portion 2 and the ring plate portion 6 forms the hook portion 162 mentioned above.

Referring to FIG. 13E, the three engaging pins 161 are faced to the burring portions 5, respectively. In this state, the engaging pins 16 are press fitted into the through holes 3 as illustrated in FIG. 13F.

Turning back to FIGS. 11 and 12, the drive hub 110 is fixed to the rotor 62 of the supply reel motor 60. The drive gear 120 is arranged coaxiallly with the rotor 62 to be movable in the axial direction. When the drive gear 120 is moved along one direction in the axial direction, the drive gear 120 is engaged with the drive hub 110 and the supply reel in the rotating direction. The spring 130 urges the drive gear 120 towards the one direction in the axial direction. The ring cam 140 is arranged coaxially with the rotor 62 to be rotatable. The cylindrical member 150 is arranged coaxially with the rotor 62. The drive ring 160 is arranged coaxially with the rotor 62 to be movable in the axial direction. The inner cylindrical portion 2 of the drive ring 160 extends from the inner peripheral end of the ring plate portion 6 towards the other direction in the axial direction to be engaged with the drive gear 120 in the axial direction against urging force of the spring 130.

As thus far been described in conjunction with the preferred embodiment, it will readily be understood that this invention is not restricted to the foregoing embodiment. For example, in the foregoing embodiment, the chassis 20 comprises a sheet metal chassis made of an iron-based magnetic material. Alternatively, the chassis 20 may be formed by die-casting or resin molding. In the foregoing embodiment, the rotary shaft of the ring cam and a thrust stop are formed by the three guide pins 145. Alternatively, the cylindrical member 150 with the guide slits 150a may be used as the rotary shaft and the thrust stop may separately be formed. In the foregoing embodiment, opening portions of the guide slits 150a to receive the drive ring 160 inserted therein are formed at the lower end of the cylindrical member 150. Alternatively, the lower end of the cylindrical member 150 may be closed and, instead, a base portion of the cylindrical member 150 may be opened. Furthermore, in the foregoing embodiment, the number N of the components symmetrically arranged around a center axis or the rotary shaft at an equiangular interval is equal to three. However, the number N may be equal to four or more, as will readily be understood. Instead of the through holes 3 and the burring portions 5, the drive ring 160 may be provided with protrusions corresponding to the engaging pins 161 and integrally formed.

What is claimed is:

1. A loading mechanism for use in a tape drive comprising a supply reel motor for driving a supply reel in a tape cartridge, said loading mechanism being provided for engaging a rotor of said supply reel motor with said supply reel, and said loading mechanism comprising:

a drive hub fixed to said rotor;

a drive gear arranged coaxially with said rotor to be movable in an axial direction, said drive gear being engaged with said drive hub and said supply reel in a rotating direction when said drive gear is moved in a first direction in said axial direction;

a spring urging said drive gear towards said first direction in said axial direction; and a control mechanism for controlling the movement of said drive gear in said axial direction, wherein said control mechanism comprises:

a ring cam arranged coaxially with said rotor to be rotatable and having a cam groove formed on a peripheral surface of the ring cam;

a cylindrical member arranged coaxially with said rotor and having a guide slit extending in said axial direction;

a drive ring arranged coaxially with said rotor so as to be movable in said axial direction and engaged with said drive gear against an urging force of said spring, wherein said drive ring is formed by pressing a ring-shaped plate material and said drive ring has a ring plate portion arranged coaxially with said rotor and an outer cylindrical portion extending from an outer peripheral end of said ring plate portion towards a second direction in said axial direction; and an engaging pin fixed to said drive ring and engaged through said guide slit with said cam groove.

2. The loading mechanism according to claim 1, wherein said engaging pin is fixed to said outer cylindrical portion.

3. The loading mechanism according to claim 2, wherein said outer cylindrical portion has a through hole of a burring shape, and said engaging pin is press fitted into said through hole.

4. The loading mechanism according to claim 2, wherein said engaging pin is integrally formed with said outer cylindrical portion.

5. The leading mechanism according to claim 1, wherein said drive ring has an inner cylindrical portion extending from an inner peripheral end of said ring plate portion towards the second direction in said axial direction so as to he engaged with said drive gear.

6. The loading mechanism according to claim 5, wherein each of said outer cylindrical portion and said inner cylindrical portion is formed by drawing said ring-shaped plate material.

7. The loading mechanism according to claim 1, further comprising a chassis with said supply reel motor fixed thereto, wherein said cylindrical member is formed by bending a part of sand chassis towards the second direction in said axial direction so that said cylindrical member is arranged coaxially with said rotor.

8. A tape drive comprising:

(a) a supply reel motor for driving a supply reel in a rape cartridge;

(b) a chassis supporting said supply reel motor fixed thereto; and (c) a loading mechanism arranged between said chassis and said supply reel motor to engage a rotor of said supply reel motor with said supply reel, said loading mechanism comprising:

a drive hub fixed to said rotor;

a drive gear arranged coaxially with said rotor to be movable in an axial direction, said drive gear being engaged with said drive hub and said supply reel in a rotating direction when said drive gear is moved in a first direction in said axial direction;

a spring urging said drive gear towards said first direction to said axial direction; and a control mechanism for controlling the movement of said drive gear in said axial direction, wherein said control mechanism comprises:

a ring cam arranged coaxially with said rotor to be rotatable and having a cam groove formed on a peripheral surface of the ring cam;

a cylindrical member arranged coaxially with said rotor and having a guide slit extending in said axial direction;

a drive ring arranged coaxially with said rotor so as to be movable in said axial direction and engaged with said drive gear against an urging force of said spring, wherein said drive ring is formed by pressing a ring-shaped plate material and said drive ring has a ring plate portion arranged coaxially with said rotor and an outer cylindrical portion extending from an outer peripheral end of said ring plate portion towards a second direction in said axial direction; and an engaging pin fixed to said drive ring and engaged through said guide slit with said cam groove.

* * * * *